United States Patent
Tapia

(10) Patent No.: US 10,708,795 B2
(45) Date of Patent: *Jul. 7, 2020

(54) ARTIFICIAL INTELLIGENCE-BASED NETWORK ADVISOR

(71) Applicant: TUPL, Inc., Snoqualmie, WA (US)

(72) Inventor: Pablo Tapia, Snoqualmie, WA (US)

(73) Assignee: TUPL, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,688

(22) Filed: Jun. 6, 2017

(65) Prior Publication Data

US 2017/0353991 A1    Dec. 7, 2017

Related U.S. Application Data

(60) Provisional application No. 62/346,997, filed on Jun. 7, 2016.

(51) Int. Cl.
*G06F 15/173* (2006.01)
*H04W 24/04* (2009.01)
(Continued)

(52) U.S. Cl.
CPC ............ *H04W 24/04* (2013.01); *G06Q 10/20* (2013.01); *H04W 24/02* (2013.01)

(58) Field of Classification Search
CPC ... G06F 19/24; H04N 21/466; H04N 21/4662
See application file for complete search history.

(56) References Cited

U.S. PATENT DOCUMENTS

2003/0005112 A1* 1/2003 Krautkremer ....... H04L 41/0213
709/224
2004/0010667 A1    1/2004 Brenner
(Continued)

FOREIGN PATENT DOCUMENTS

WO    WO2013149870 A1    10/2013
WO    2016068926 A1    5/2016
WO    WO2016068926 A1    5/2016

OTHER PUBLICATIONS

International Search Report and Written Opinion dated Sep. 15, 2017, for PCT Application No. PCT/2017/036353, 10 pages.
(Continued)

*Primary Examiner* — Ryan J Jakovac

(57) ABSTRACT

A network fix application may automatically determine a root cause of an issue with a wireless carrier network and generate a network fix prioritization to implement a solution for the root cause before receiving a customer or network trouble ticket. Initially, a data adaptor platform may receive performance data regarding user device and network components of a wireless carrier network from multiple data sources. The network fix application may analyze the performance data using a trained machine learning model to predict a root cause for the issue affecting the one or more user devices based on the symptoms indicated in the performance data. Additionally, the network fix application may analyze the performance data using another trained machine learning model to provide a network fix prioritization to implement a resolution for each predicted root cause in the most optimal order.

20 Claims, 6 Drawing Sheets

(51) Int. Cl.
*H04W 24/02* (2009.01)
*G06Q 10/00* (2012.01)

(56) References Cited

U.S. PATENT DOCUMENTS

| | | | | |
|---|---|---|---|---|
| 2008/0104454 A1* | 5/2008 | White | ............... | H04N 21/2225 |
| | | | | 714/48 |
| 2010/0274433 A1* | 10/2010 | Prokhorov | ............ | G06N 5/042 |
| | | | | 701/31.4 |
| 2013/0238534 A1 | 9/2013 | Nagaraj et al. | | |
| 2014/0071814 A1 | 3/2014 | Landscheidt et al. | | |
| 2014/0317280 A1* | 10/2014 | Ke | ..................... | H04L 43/0882 |
| | | | | 709/224 |
| 2015/0356144 A1* | 12/2015 | Chawla | ................ | H04W 4/025 |
| | | | | 707/741 |
| 2016/0021173 A1 | 1/2016 | Tapia | | |
| 2016/0021503 A1 | 1/2016 | Tapia | | |
| 2016/0080460 A1* | 3/2016 | Chung | ................. | H04M 3/304 |
| | | | | 709/224 |
| 2017/0070898 A1* | 3/2017 | Anderson | ............ | H04W 24/04 |

OTHER PUBLICATIONS

Search Report dated Nov. 20, 2019 for Application No. EP17810935.

\* cited by examiner

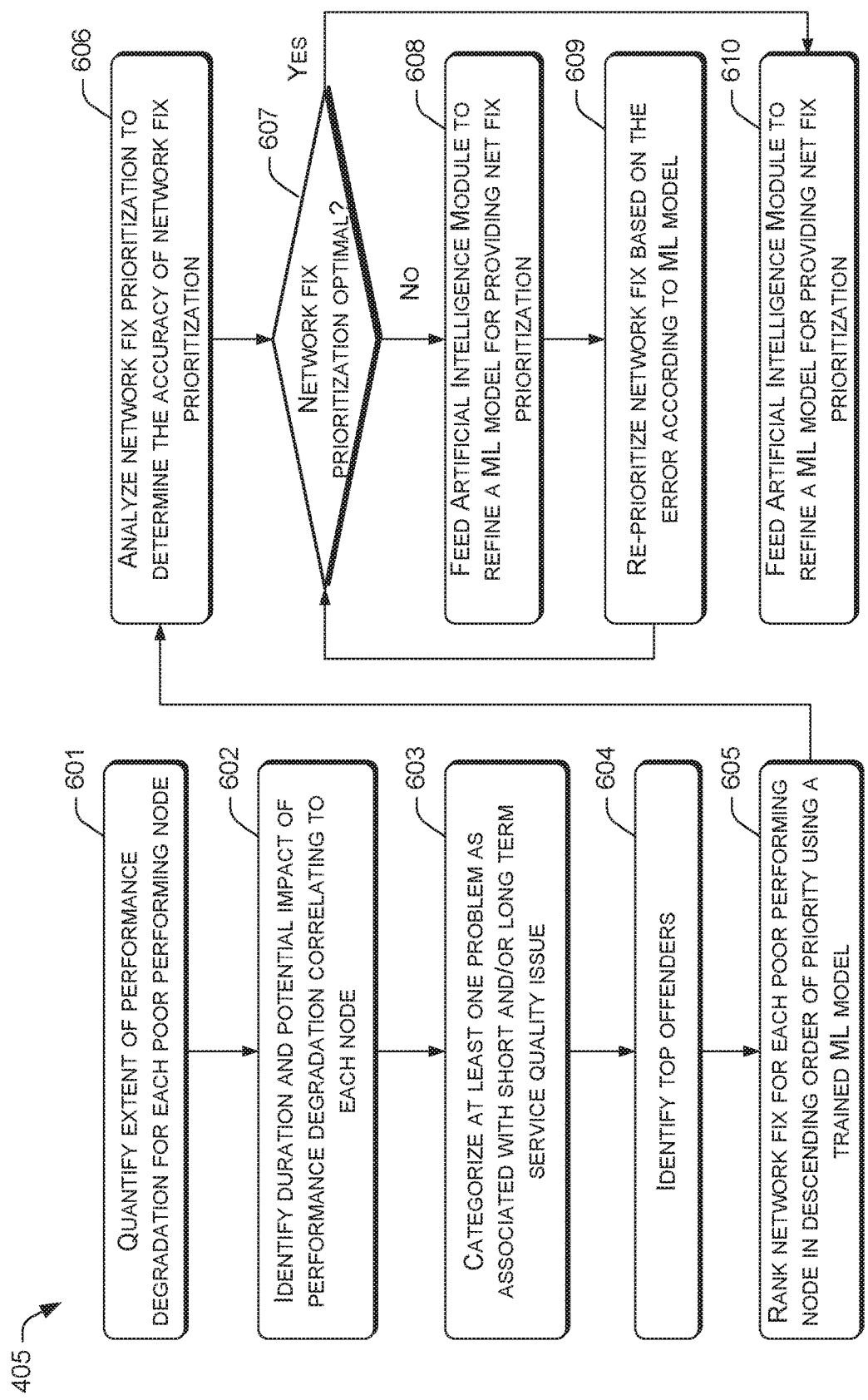

ARTIFICIAL INTELLIGENCE-BASED NETWORK ADVISOR

CROSS REFERENCE TO RELATED PATENT APPLICATIONS

This application claims priority to U.S. Provisional Patent Application No. 62/346,997, filed on Jun. 7, 2016, entitled "Artificial Intelligence-Based Network Advisor," which is hereby incorporated by reference in its entirety.

BACKGROUND

Managing and troubleshooting wireless communication device and carrier network issues is crucial for wireless telecommunication carriers to provide quality service for their subscribers. Generally, many wireless telecommunication carriers utilize key performance indicators or other types of network performance data to analyze the performance of the carrier network and mitigate identified problems. For instance, upon receiving a trouble ticket for call quality issues (e.g., dropped calls, excessive power clipping, or a combination of both), call quality for one or more cell sites can be addressed by providing additional resources per user according to demand (e.g., adjusting cell size and shape, power levels, antenna tilt, etc.). However, such approaches can have considerable lead-time delays that diminish customer experience and that can incur capital expenditure and operating expenses.

In some instances, a lack of certain resources and proper troubleshooting tools may cause network engineers of the wireless telecommunication carrier to spend an excessive amount of time processing and analyzing trouble tickets. In this regard, the troubleshooting is largely managed in a reactive manner rather than a proactive manner and therefore causes a delay in resolving quality of service issues, which may result in a loss of revenue, customer base, and business reputation for the wireless telecommunication carrier.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 6 is a flow diagram of an example process for providing network fix prioritization using a trained machine learning model.

DETAILED DESCRIPTION

Figure 1:
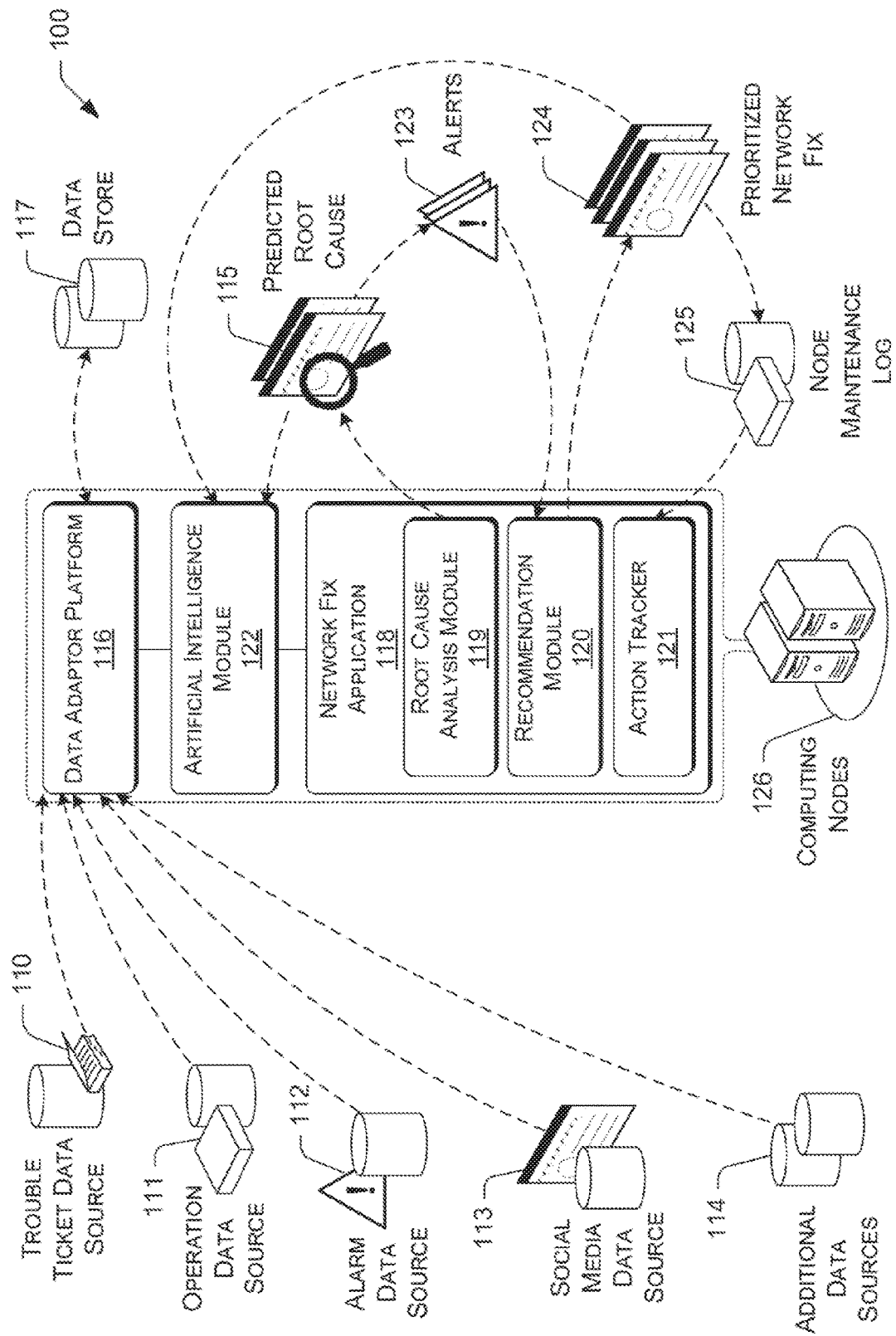
FIG. 1 illustrates an example architecture for performing proactive device and network data analysis of a wireless carrier network to predict root cause and provide network fix prioritization to resolve short and long-term quality of service issues.

This disclosure is directed to techniques for using a data adaptor platform in conjunction with a network fix applications to perform a proactive analysis of user device performance data and network performance data of a wireless carrier network to predict root cause for short and long-term problems in network nodes and prioritize network fix to implement a solution in an efficient manner. The user device performance data and the network performance data may be obtained from multiple data sources. Without limitation, the multiple data sources may provide RAN Operation Support System (OSS) counters, Call Detail Records (CDRs), alarm data, alert data, trouble ticket data comprising customer ticket data and network ticket data, social media data, operation data, key performance indicator (KPI) data, device performance data, planning data, as well as other data that are related to the operations of the wireless carrier network.

Data collected from the aforementioned sources are aggregated or consolidated via the data adaptor platform in order to perform a real or non-real time analysis to identify areas that comprise performance data that fall below a predetermined threshold. Issues negatively affecting the performance of user devices and network components are identified from the performance data and then analyzed using one or more trained machine learning model to correlate detected symptoms to the potential root cause for each quality of service issues. The issues identified can be further analyzed using one or more trained machine learning model to establish priority for a network fix based on several factors such as a potential negative impact on network performance and top offender cells within the wireless carrier network.

In some embodiments, a network fix application can continuously monitor performance data related to user devices and network components in a wireless carrier network to determine whether one or more particular geographical areas within the network has a negatively impacted performance or a performance level that fall below a predetermined threshold. Based on such a determination, the network fix application may analyze the symptoms of the quality of service issues to predict a potential root cause of the quality of service issues. Additionally, the network fix application may recommend one or more courses of action to resolve the quality of service issues and prioritize a network fix to implement the resolution for each of the issues associated with a predicted root cause based on expected impact, duration, short or long-term effect, available resources, and/or so forth.

The network fix application may utilize at least one trained machine learning model to analyze the user device performance data and the network performance data to automatically predict root causes for a quality of service issues and to prioritize network fix. The machine learning model can be augmented as needed by adding additional training data sets and/or training results from one or more machine learning algorithm based on feedback regarding the accuracy of the root cause predictions and network fix prioritization optimization.

The proactive analysis of user device performance data and network performance data of a wireless carrier network may help streamline the process of network maintenance by predicting root cause for problems based on symptoms derived from performance data and prioritizing network fix with a foresight perspective, thereby reducing the burden of handling subsequent subscriber trouble tickets and/or network trouble tickets. Further, the use of a machine learning model during the analysis may enable the automatic prognosis and resolution of network issues in an efficient manner. The techniques described herein may be implemented in a number of ways. Example implementations are provided below with reference to the following FIGS. 1-6.

Example Architecture

FIG. 1 illustrates an example architecture for performing proactive device and network data analysis of a wireless carrier network to resolve short and long-term quality of service issues. The architecture 100 comprises a data adaptor platform 116, a network fix application 118, and an artificial intelligence module 122. The data adaptor platform 116, the network fix application 118, and the artificial intelligence module 122 may execute on one or more computing nodes 126. The computing nodes 126 may be distributed processing nodes that are scalable according to workload demand. In various embodiments, the computing nodes 126 may include general purpose computers, such as desktop computers, tablet computers, laptop computers, servers, and so forth. However, in other embodiments, the computing nodes 126 may be in the form of virtual machines, such as virtual engines (VE) and virtual private servers (VPS). The computing nodes 126 may store data in a distributed storage system, in which data may be stored for long periods of time and replicated to guarantee reliability. Accordingly, the computing nodes 126 may provide data and processing redundancy, in which data processing and data storage may be scaled in response to demand. Further, in a networked deployment, new computing nodes 126 may be added on the fly without affecting the operational integrity of the data adaptor platform 116, the network fix application 118, and the artificial intelligence module 122.

The data adaptor platform 116 may include a cloud layer that controls hardware resources and a data management layer that manages data processing and storage. The cloud layer may provide software utilities for managing computing and storage resources. In various embodiments, the cloud layer may provide a generic user interface for handling multiple underlying storage services (e.g., local servers, Amazon AWS™, Digital Ocean™, etc.) that stores the call data collected by the data adaptor platform 116. The cloud layer may also provide an integrated view of multiple servers and clusters from various providers, such as Hortonworks™, Cloudera™, MapR™, etc.). Additionally, the cloud layer may provide monitoring utilities to oversee utilization of resources and alerts for managing data storage or processing capacity. Accordingly, the cloud layer may facilitate the deployment, configuration, and activation of local and cloud servers, as well as facilitate the deployment, configuration, and activation of applications and/or services.

The data management layer may include software utilities and databases that facilitate the acquisition, processing, storage, reporting, and analysis of data from multiple data sources. In various embodiments, the data management layer may provide an application program interface (API) that decouples backend data management elements from data processing elements, such that the data may be distributed and stored in different data stores. For example, these data stores may include Hadoop Distributed File System™ (HDFS), Apache Spark™, Apache HBase™, and/or so forth. The APIs of the data management layer may be used by custom analytic engines and/or other third party tools to access the data in the different data stores. The data management layer may further include multiple data adaptors that are able to obtain multiple types of data from multiple data sources. The data adaptor platform 116 may access the multiple data sources via a network. The network may be a local area network (LAN), a larger network such as a wide area network (WAN), or a collection of networks, such as the Internet. The data adaptor platform 116 may use multiple connectors in the form of applications, APIs, protocols, and services, to support connectivity with data sources and data stores, these connectors may include FTP/SFTP, HTTP/HTTPS, Java Message Service™ (JMS), Apache Kafka™, Apache Flume™, Apache Solr™, Java Database Connectivity™ (JDBC), User Datagram Protocol (UDP), and/or so forth.

Accordingly, the data adaptor platform 116 may provide the network fix application 118 with data from a variety of data sources discussed herein and store the data in the data store 117, wherein the data in the data store 117 I accessible to the network fix application 118. In the illustrated embodiment, the data sources may include a trouble ticket data source 110, an operation data source 111, an alarm data source 112, a social media data source 113, and other data sources 114 that provide various types of performance data.

The trouble ticket data source 110 may include data on issues with the components or operations of the wireless carrier network. In some instances, network trouble tickets may be automatically generated by software agents that monitor the health and performance of the wireless carrier network. In other instances, subscriber trouble tickets may be manually inputted by customers and/or customer care representative to describe issues experienced by the customers. The trouble ticket data source 110 may further include data on the identities of the administrators, resolution reports for the issues, statistics for each type or category of issues reported, statistics on issue resolution rates, and/or so forth.

The operation data source 111 may include a data collection that provides performance information about the wireless carrier network and the user devices that are using the wireless carrier network. In various embodiments, the performance information may include Radio Access Network (RAN) OSS counters, Call Detail Records (CDRs), VoLTE call traces, Session Initiation Protocol (SIP) trace data, Real-Time Transport Protocol (RTP) Control Protocol (RTCP) trace data, user device data traffic logs, user device system event logs, user device bug reports, and/or other device and network component performance information. The data collection may further provide network topology data, network expansion/modification data, network coverage data, and planned maintenance data. The network topology data may include locations of network cells, network backhauls, core network components, and/or so forth. The network coverage data may include information on the signal coverage and communication bandwidth capabilities of the network cells, the performance specifications and operation statuses of backhaul, network cells, and core network components, and/or so forth. The network cells may include macrocells, picocell, femtocells, microcells, and/or so forth.

The performance information on user devices that are provided by the operation data source 111 may further include user device and account information. The device information may indicate technical capabilities, features, and operational statuses of user devices that are used by subscribers on the wireless carrier network. The user account information may include account details of multiple subscribers, such as account types, billing preferences, service plan subscriptions, payment histories, data consumption statistics, and/or so forth.

The alarm data source 112 may include alerts for the wireless carrier network that are generated based on predetermined alert rules by a status monitoring application of the network. An alert rule may specify that an alert is to be triggered when one or more conditions with respect to the operations of the network occur. The conditions may be specific faults or issues that are detected with components of the network, deviation of actual performance indicators from predetermined threshold performance values, a number of user complaints regarding a network component, network node, or network service reaching or failing to reach a predetermined threshold, and/or so forth.

The social media data source 113 may include data collections provided by social networking portals. A social networking portal may be established by a wireless carrier network that is being evaluated by the network fix application 118. Another social networking portal may be a portal that is maintained by a third-party service provider for users to share social media postings. An additional social networking portal may be a web portal that is created and maintained by a particular user solely for the particular user to present social postings. The social networking portals may enable users to post and share information, reviews, and/or other comments regarding service providers, products, services, merchants, networks, and/or so forth. For example, the social networking portals may include blog web pages, message feed web pages, web forums, and/or electronic bulletin boards. A user may establish a personalized social networking portal so that other users may subscribe to the social postings of the user, leave comments for the user or other visitors to the personalized social networking portal, and/or perform other social networking activities. The social postings may highlight network problems with the wireless carrier network as experienced by different subscribers at various geolocations.

Once the data from the social media data collections are obtained via data adapters, a data mining algorithm of the data adaptor platform 116 may extract words, terms, phrases, quotes, or ratings that are relevant to the operational conditions or performance status of the nodes, components, and/or services of the wireless carrier network. The data mining algorithm may use both machine learning and non-machine learning techniques such as decision tree learning, association rule learning, artificial neural networks, inductive logic, Support Vector Machines (SVMs), clustering, Bayesian networks, reinforcement learning, representation learning, similarity and metric learning, and sparse dictionary learning to extract the patterns. In one example, the data adaptor platform 116 may discover a pattern of web blog posting that indicates users are dissatisfied with an aspect of a service provided by the wireless carrier network at a particular geographical location. In another example, the data adaptor platform 116 may discover a pattern of message feed postings from multiple users that indicate a specific type of user device has a high error rate when used in conjunction with the wireless carrier network.

The additional data sources 114 may include other data sources that are controlled by the wireless carrier network or third-parties, such as data reports from the network monitoring tools. In various embodiments, the network monitoring tools may include diagnostic tools, optimization tools, configuration tools, and/or so forth. The data reports may include key performance indicators (KPIs). The KPIs may be generated based on KPI configuration files that designate specific KPIs to be generated. The KPIs may measure the performance of a specific device or network component. Alternatively, the KPIs may also provide high level aggregated performance measurements for multiple network or device components, for particular classes of network or device components, and/or so forth.

In some embodiments, the network fix application 118 comprises a root cause analysis module 119, recommendation module 120, and an action tracker 121. The network fix application 118 can analyze the wireless carrier network's performance from multiple sources of data obtained by the data adaptor platform 116 to provide one or more predicted root cause 115 via the root cause analysis module 119 and to prioritize network fix 124 via the recommendation module 120 for each identified potential and/or actual quality of service issue within the network. Additionally, the network fix application 118 can verify network performance improvement via the action tracker 121 once the network fix has been implemented.

More specifically, the root cause analysis module 119 can provide a predicted root cause 115 for a problem that is related to one or more symptoms derived from the performance data in order to aid in the resolution of quality of service issues for the wireless carrier network and provide alerting 123 of predicted root cause (e.g., to a network engineer, an administrator, and/or an administrative entity). In some embodiments, the root cause analysis module 119 is configured to determine common points of failure and where problems occur based on KPIs. Thereafter, the predicted root cause module 119 can match performance pattern with previously stored performance pattern or symptom that corresponds to a particular type of data transmission issue and/or root cause.

For example, the root cause analysis module 119 can determine that overshooting is the most likely predicted root cause based on performance data that indicate to symptoms that have previously pointed to similar or identical symptoms related to a coverage problem. In another example, the root cause analysis module 119 can determine that layer imbalance is the most likely predicted root cause based on performance data that indicate to symptoms that have previously pointed to similar or identical symptoms related to a congestion problem.

Additionally, the recommendation module 120 can determine the potential impact (e.g., based a number of subscribers affected, size of a geolocation affected, a number of user devices and network components affected, etc.), short and/or long-term effects, time frequency, and/or time duration of each of the problems associated with the predicted root cause and provide network fix prioritization in order to address each of the problem and/or root cause in the most efficient manner. In some embodiments, additional factors such as resources and labor required to provide network fix can be further considered for determining network fix priority. In one example, the recommendation model 120 can rank network fix based the aggregation of one or more of the aforementioned factors in descending order of priority. In another example, the recommendation model 120 can generate a ranking list, wherein top offenders are identified and ranked toward the top of the list. In this way, issues related to or caused by the top offenders are addressed first.

In some embodiments, the recommendation module 120 can further provide suggestions or courses of action for a network fix associated with a predicted root cause in order to resolve a service quality issue. For example, the recommendation module 120 is configured to correlate suggestions or specific courses of action to a predicted root cause. In this regard, the recommendation module 120 can communicate with a solutions database to derive solutions or courses of action therefrom. Additionally, the recommendation module 120 may be configured to provide one or more suggestions or courses of action in an order of preference based on several factors such as available resources, constraints, user feedback, geolocation, and/or so forth. The network fix application 118 can generate, record, and manage node tickets generated for each issue identification, predicted root cause, network fix prioritization, node fix, and the node tickets are stored in the node maintenance log 125.

In some embodiments, the network fix application 118 may leverage one or more trained machine learning model via the artificial intelligence module 122 to analyze the user device performance data and the network performance data within the network to determine likely root causes for a quality of service issues for subscribers and to determine the most optimal order of providing network fix to address the root causes. In this regard, a network fix prioritization is optimal if the network fix prioritization enables a predetermined number of network fixes to be made within a predetermined period of time. Alternatively, a network fix prioritization is optimal if the order in which network fixes are made according to the network fix prioritization can enable improvement of the quality of service for a predetermined number of subscribers within a predetermined period of time. In another example, a network fix prioritization is optimal if the order in which network fixes are made according to the network fix prioritization can increase the network performance level within a predetermined period of time.

Additionally, one or more machine learning models can be used to provide suggestions or courses of action for a network fix to resolve service quality issues. Thus, the network fix application 118 may address potential network issues before receiving customer complaints or trouble tickets, thereby proactively managing network performance and reducing subsequent troubleshooting time and effort. The trained machine learning model may be created using feature engineering that ascertains the properties and relationships of the training corpus to distinguish between the data classes. Further, the machine learning model may incorporate a combination of multiple machine learning algorithms, such as a Bayesian algorithm, a decision tree algorithm, an SVM algorithm, to increase the accuracy of the root cause predictions and issue prioritization generated by the module 122.

Example Computing Device Components

Figure 2:
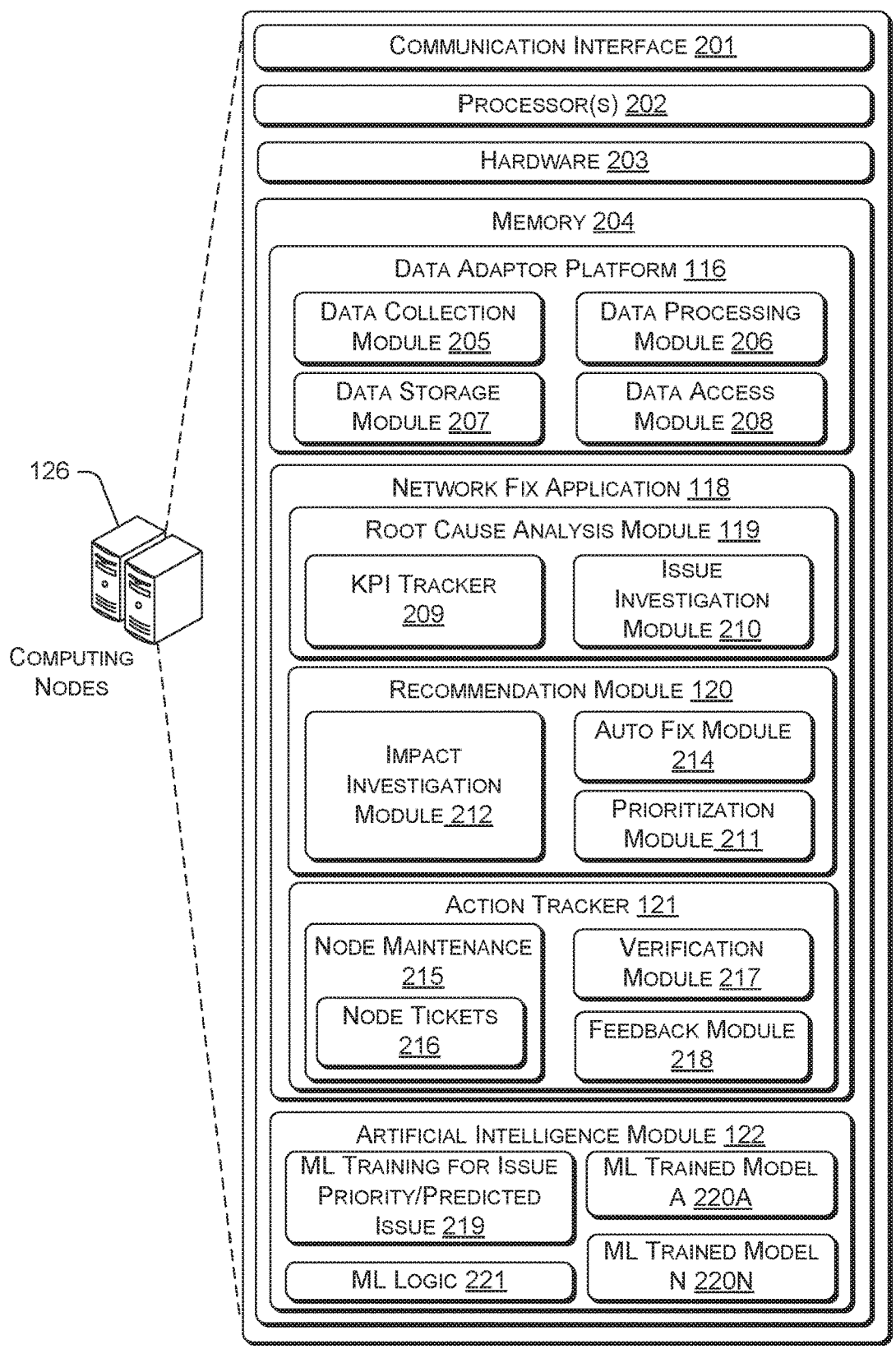
FIG. 2 is a block diagram showing various components of a data adaptor platform, network fix application, and artificial intelligence module for performing device and network data analysis of a wireless carrier network to predict root cause and provide network fix prioritization to resolve short and long-term quality of service issues.

FIG. 2 is a block diagram showing various components of a data adaptor platform, a network fix application, and artificial intelligence module that performs proactive device and network data analysis of a wireless carrier network to resolve short and long-term quality of service issues. The data adaptor platform 116, the network fix application 118, and the artificial intelligence module 122 may be implemented by one or more computing nodes 126 of a distributed processing computing infrastructure. The number of computing nodes 126 may be scaled up and down by a distributed processing control algorithm based on the data processing demands of the data adaptor platform 116, the network fix application 118, and/or the artificial intelligence module 122. For example, during peak performance data processing times, the number of computing nodes 126 that are executing performance data processing functionalities of the network fix application 118 may be scaled up on the fly based on processing demand. However, once the processing demand drops, the number of computing nodes 126 that are executing the performance data processing functionalities may be reduced on the fly. Such scaling up and scaling down of the number of computing nodes 126 may be repeated over and over again based on processing demand.

The computing nodes 126 may include a communication interface 201, one or more processors 202, and memory 204. The communication interface 201 may include wireless and/or wired communication components that enable the one or more computing nodes 126 to transmit data to and receive data from other networked devices. The computing nodes 126 may be accessed via hardware 203. The hardware 203 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 204 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The data adaptor platform 116 may include a data collection module 205, a data storage module 207, and a data access module 208. The modules may include routines, program instructions, objects, and/or data structures that perform particular tasks or implement particular abstract data types. The data collection module 205 may use data adaptors to retrieve data from the structured or unstructured databases of the data sources 110-114. Since the structured databases provide data that are accessible via simple data retrieval algorithms, the data collection module 205 may use data-agnostic data adaptors to access the data sources without taking into consideration the underlying content of the data. Further, changes to the data content in each data source the do not affect the functionality of the corresponding data-agnostic data adaptors. On the other hand, the data collection module 205 may use database-specific data adaptors to access structured databases.

The data collection module 205 may include a workflow scheduler that periodically checks for and retrieves newly available data from the multiple data sources. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing. Accordingly, the data collection module 205 may retrieve data with different generation latencies (e.g., one minute, fifteen minutes, one hour, one day etc.), as well as data with different spatial aggregation (e.g., network cell data, network node data, radio network controller data, etc.) such that real time or non-real time data analysis may be performed.

In various embodiments, the data processing module 206 may implement adaptor-specific logics to decode the format of the performance data from the data sources 110-114. Accordingly, the performance data may be fed into other modules for analysis and storage. In some embodiments, the data processing module 206 may aggregate data from multiple data sources for a particular time period into an aggregated data file of data sets according to one or more grouping parameters. The grouping parameters may include specific time periods (e.g., hourly, daily, etc.), network components, user device vendor, user device models, and/or so forth. In other embodiments, the grouping parameters may be used to aggregate the data into multiple datasets that correspond to different levels of a network hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation. Nevertheless, the aggregated data from the multiple data sources may be stored in the data sets according to their own storage schemas. In other embodiments, the data processing module 214 may converge the data from multiple data sources for a particular time period into a converged data file of data sets, in which the data are stored in the data sets according to a unitary storage schema.

The data storage module 207 may store data across multiple virtual data storage clusters with redundancy, so that the data may be optimized for quick access. The stored data may include the performance data from the data sources 110-114, the aggregated and covered data files, data that are generated by the network fix application 118, and/or so forth. The data access module 208 may provide a data access API for accessing the data stored in the multiple virtual storage clusters. Accordingly, the API may be used by the network fix application 118 as well as other third-party application to access the data that received and stored by the data adaptor platform 116.

The network fix application 118 is configured to provide a predicted root cause and network fix prioritization. The network fix application 118 may process real time or non-real time data from various geographic locations, in which data from multiple data sources may be aggregated, converged, or otherwise consolidated. The network fix application 118 may identify a root cause for an issue affecting one or more subscribers of a wireless carrier network based on a set of live performance data using at least one machine learning model. The network fix application 118 may further generate a solution for the root cause using the machine learning model and/or a solutions database.

In various embodiments, the live performance data may be real time or non-real time data pertaining to one or more network components of the wireless carrier network and/or one or more device components of the user devices that are using the wireless carrier network. The live performance data may include aggregated, converged, or consolidated data sets that are obtained from the data sources 110-114. The live performance data may be analyzed to provide a predicted root cause and a network fix prioritization that are generated using the machine learning model and are presented via an application user interface of the network fix application.

The network fix application 118 may include a root cause analysis module 119, a recommendation module 120, and an action tracker 121. The root cause analysis module 119 comprises a KPI tracker 209 and an issue investigation module 210. The KPI tracker 209 may measure the performance of network components of the wireless carrier network and/or performance of device components of user devices that use the wireless carrier network. In various embodiments, the KPIs may be high-level KPIs that capture service performance, such as call establishment delays, mean opinion scores (MOS) of call audio quality, one-way audio problems, and network cell handover problems, difficulties with transitions between VoWiFi and VoLTE, and/or so forth. In some embodiments, the KPI tracker 209, via an application user interface, is configured to visually present the performance of network components of the carrier network and/or the performance of user devices within the network.

The issue investigation module 210 analyzes KPIs as well as the various sources of data 110-114 obtained by the data adaptor platform 116 identify the quality of service issues within the network, wherein the quality of service issues negatively impact the performance of the user devices and/or network components so that the performance level falls below a predetermined threshold and/or the user devices and/or network components experience a rate of error that is higher than a maximum error threshold. Upon determining that there is at least one quality of service issues, the issue investigation module 210 generates at least one predicted root cause associated with one or more symptoms relating to the quality of service issues derived from the obtained data.

The recommendation module 120 comprises a prioritization module 211 and an impact investigation module 212. The impact investigation module 212 analyzes various sources of data obtained by the data adaptor platform 116 to determine potential short-term and/or long-term impact associated with various quality of service issues within the network. Additionally, the impact investigation module 212 analyzes data to determine other factors such as the duration, the short and/or long-term effects, and the type of the quality of service issues and assess the overall potential short-term and/or long-term impact associated with the quality of service issues. In some embodiments, the impact investigation module 212 considers additional data or factors such as resources and limitations in order to determine the overall potential short-term and/or long-term impact.

The prioritization module 211 analyzes the potential short-term and/or long-term impact of the various network issues and generates a network fix prioritization to implement a solution for the network issues in a specific order that is the most optimal and efficient. Preferably, the network fix is implemented in order by descending priority or importance. The auto fix module 214 is configured to generate a solution or a course of action to resolve the network performance issues.

The network fix application 118 further includes an action tracker 121 that comprises a node maintenance module 215 for maintaining node tickets 216, a verification module 217, and a feedback module 218. The verification module 217 reviews the performance of network components of the wireless carrier network and/or performance of device components of user devices that use the wireless carrier network once a solution or a course of action has been implemented, for example, via the recommendation module 120. The feedback module 218 communicates with the artificial intelligence module 122 to provide feedback as to whether the predicted root cause is correct or the network fix prioritization is optimal. Additionally, the feedback module 218 determines whether an expected performance improvement is achieved based on the performances of network components and the user devices after a solution or a course of action has been implemented.

In some embodiments, the network fix application 118 further comprises a user interface for interacting or communicating with one or more components of the network. For example, the user interface is configured to receive user requests and input data, as well as to provide predicted root cause, network fix prioritization, and output data (e.g., network status, data reports, etc.) In this regard, the network fix application may provide the root cause and/or the network fix prioritization as well as solutions and courses of actions for addressing quality of service issues for display via the application user interface.

The artificial intelligence module 122 comprises at least one machine learning training module for issue prioritization and predicting root cause 219, at least one machine learning logic 221, and one or more machine learning trained models 220A, 220N. The model training module 219 may train machine learning models 220A, 220N to analyze the performance data from the data sources 110-114 to determine root causes for the quality of service issues for subscribers and to prioritize network fix for each problem related to the root causes. In various embodiments, the model training module 219 may use a machine learning training pipeline to generate a machine learning model.

In the initial training data input phase of the machine learning training pipeline, it is contemplated that the machine learning training module 219 may receive a training corpus comprised of one or more input datasets from the data adaptor platform 116. The training corpus may include training data that emulates data collected from the multiple data sources 110-114 and optionally a set of desired outputs for the training data. For example, the data that is received during the training data input phase may include Operating Support System (OSS) counters, KPIs, network coverage details, device alarm data, network alarm data, device alert data, network alert data, CDRs, and/or so forth. In some embodiments, the training module is further configured to perform data quality assurance analyses to identify outlier data, redundant data, irrelevant data, and/or so forth.

To generate training models, the training module 119 is configured to select an initial type of machine learning algorithm to training a machine learning model using the training corpus. Without limitation, the different types of machine learning algorithms may include a Bayesian algorithm, a decision tree algorithm, an SVM algorithm, an ensemble of trees algorithm (e.g., random forests and gradient-boosted trees), an isotonic regression algorithm, and/or so forth. Once the algorithm is applied, the training module 119 determines whether a training error measurement of the machine learning model is above a predetermined threshold. The training error measurement may indicate the accuracy of the machine learning model in generating a solution in comparison to an expected baseline accuracy.

If the training error measurement exceeds the predetermined threshold, another machine learning algorithm is selected, for example, via a rules engine (e.g., algorithm selection rules) based on a magnitude of the training error measurement. More particularly, the algorithm selection rules may be used by a rules engine of the model training module to match specific ranges of training error measurement value to a specific type of machine learning algorithm. After the second machine learning algorithm is applied, the training error is measured again and this process repeats until the training error is below the predetermined threshold.

It is contemplated that additional training data sets and/or training results from one or more machine learning algorithm can be applied to augment the machine learning model. Subsequently, the process may loop back to measure another training error of the machine learning model. If the model training module determines that the training error measurement is at or below the training error threshold, the generation of a trained machine learning model is deemed to be complete.

Figure 3:
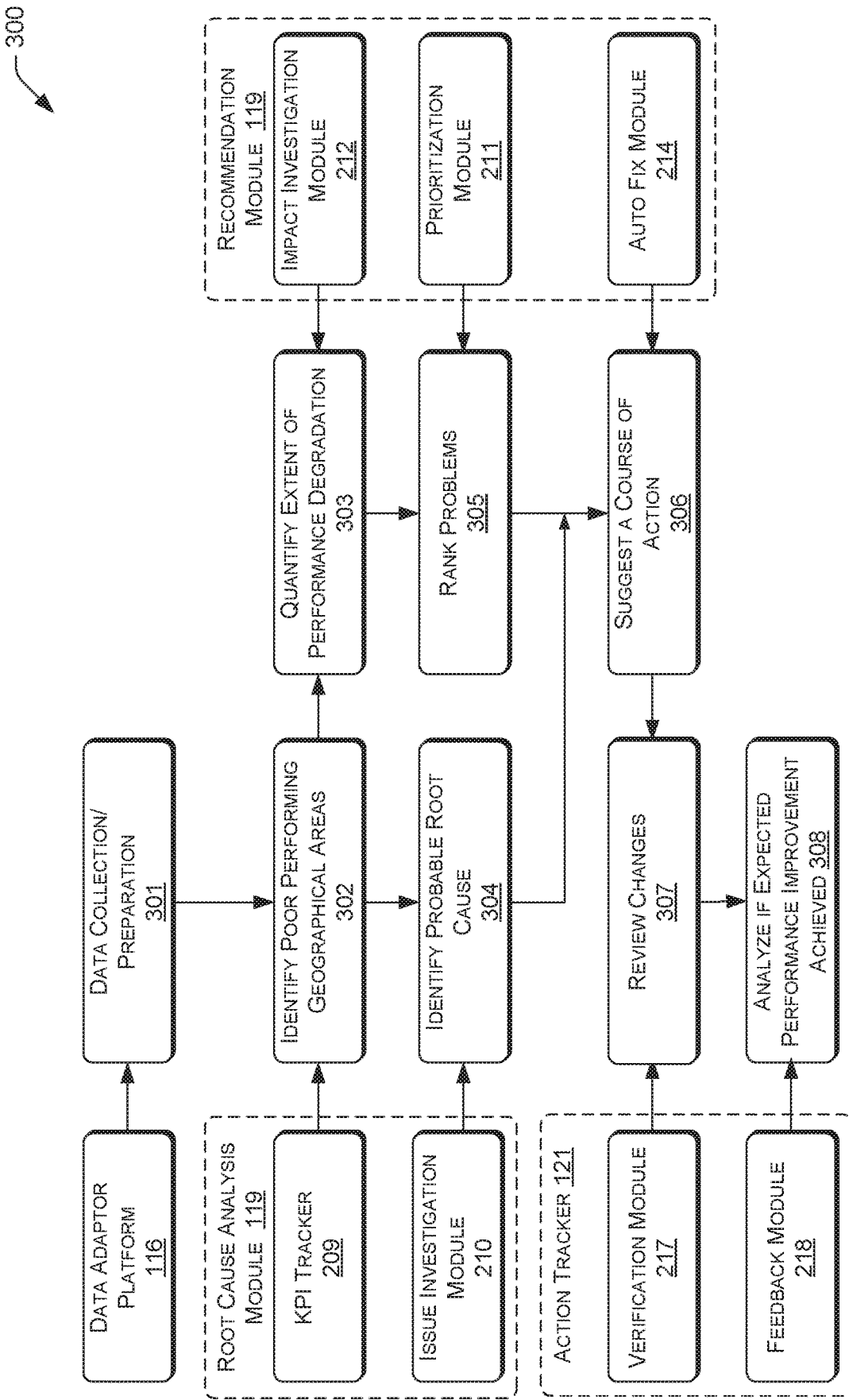
FIG. 3 is a logic circuit diagram for proactively performing root cause prediction analysis and network fix prioritization to improve short and long-term quality of service issues for a wireless carrier network.

FIG. 3 is a logic circuit diagram 300 for proactively performing root cause analysis and issue prioritization to improve short and long-term quality of service issues for a wireless carrier network. As indicated in block 301, performance information about the wireless carrier network and the user devices that are using the wireless carrier network are collected and prepared for analysis via the data adaptor platform 116. As indicated in block 302, the KPI tracker 209 of the root cause analysis module 119 measures the performance of network components of the wireless carrier network and/or performance of device components to identify poor performing geographical areas. The presentation of data relating to an identification of poor performing geographical areas may enable the network fix application to initiate network fix prioritization measures and predict root cause to address the problem with the one or more network components.

The network fix application may analyze the performance data using a trained machine learning model to determine a root cause for the issue affecting the one or more user devices. In various embodiments, the performance data that is analyzed may be real time or non-real time data for a particular time interval. Further, the performance data may include aggregated, converged, or otherwise consolidated data. The trained machine learning model may employ multiple machine learning algorithms to analyze the performance data. For example, in some instances, the network fix application may track the geolocations of a subscriber as the subscriber roams between the geolocations during a particular time interval. Subsequently, the network fix application may analyze the performance data that are related to these geolocations using the trained machine learning model to ascertain the root cause.

In various embodiments, the network fix application may provide the data on the one or more components via an application user interface. As indicated in block 304, the issue investigation module 210 of the root cause analysis module 119 identifies probable root cause 304. In some embodiments, the network fix application 118 may generate one or more predicted root cause using one or more of the trained machine learning models. The predicted root cause may be generated based on the performance data from one or more of the data sources 110-114 provided by the data adaptor platform 116. For example, the trained machine learning models may be used to automatically analyze CDRs to identify root causes of a quality of service issues with the wireless carrier network.

In other examples, the trained machine learning modules may be used to improve network quality of service, increase network performance efficiency, analyze cell data to identify fraud, analyze patterns to predict subscriber, analyze subscriber usage patterns to identify a geographical area for implementing new network services. For example, a network fix application may use a trained machine learning model to identify a root cause for an issue that is the subject of a trouble ticket or detected by a network fix application. For example, the analysis of the performance data may indicate that a potential issue existing for a specific type of user devices due to hardware or software component similarity of the specific type of user devices that are found to be experiencing a particular issue. In another example, the analysis of the performance data may indicate that a common problem (e.g., a software security vulnerability) experienced by a specific group of user devices is likely to lead to another issue (e.g., unresponsive user device) if the common problem is not fixed in a timely fashion.

As indicated in block 303, the impact investigation module 212 analyzes performance data from one or more of the data sources 110-114 to quantify the extent of performance degradation based on several factors. Thereafter, the prioritization module 211 ranks the quality of service issues 305 in order of descending priority to generate a network fix prioritization. In this regard, trained machine learning models may be used to automatically determine the order in which network fixes should be implemented. As indicated in block 306, the auto fix module 214 suggests a course of action to address the ranked problems. The auto fix module 214 can be operatively connected to a solutions database to retrieve a solution therefrom and can provide a suggestion for resolving each quality of service issue using a machine learning model. In various embodiments, the solutions database can reside on the computing nodes 126.

Any changes implemented according to the courses of action are reviewed via the verification module 217 of the action tracker 121 as indicated in block 307. The feedback module 218 can analyze the network performance data after any changes are implemented and compare it to an expected network performance. In this way, the feedback module 218 can determine whether the implemented changes resolved the quality of service issue and whether an expected performance improvement is achieved 308.

In some embodiments, a network fix application may provide an application user interface that enables a user to provide feedback on whether a trained machine learning model was effective in predicting a root cause and providing network fix prioritization. In such embodiments, a network engineer, an administrator, or an administrative entity may use an application user interface provided by the network fix application to indicate whether the predicted root cause accurately identified the problem associated with the symptoms. Additionally, the administrator or the administrative entity may use the application user interface to indicate whether the network fix prioritization provides an optimal order of addressing the quality of service issues associated with one or more predicted root cause.

Example Process

Figure 4:
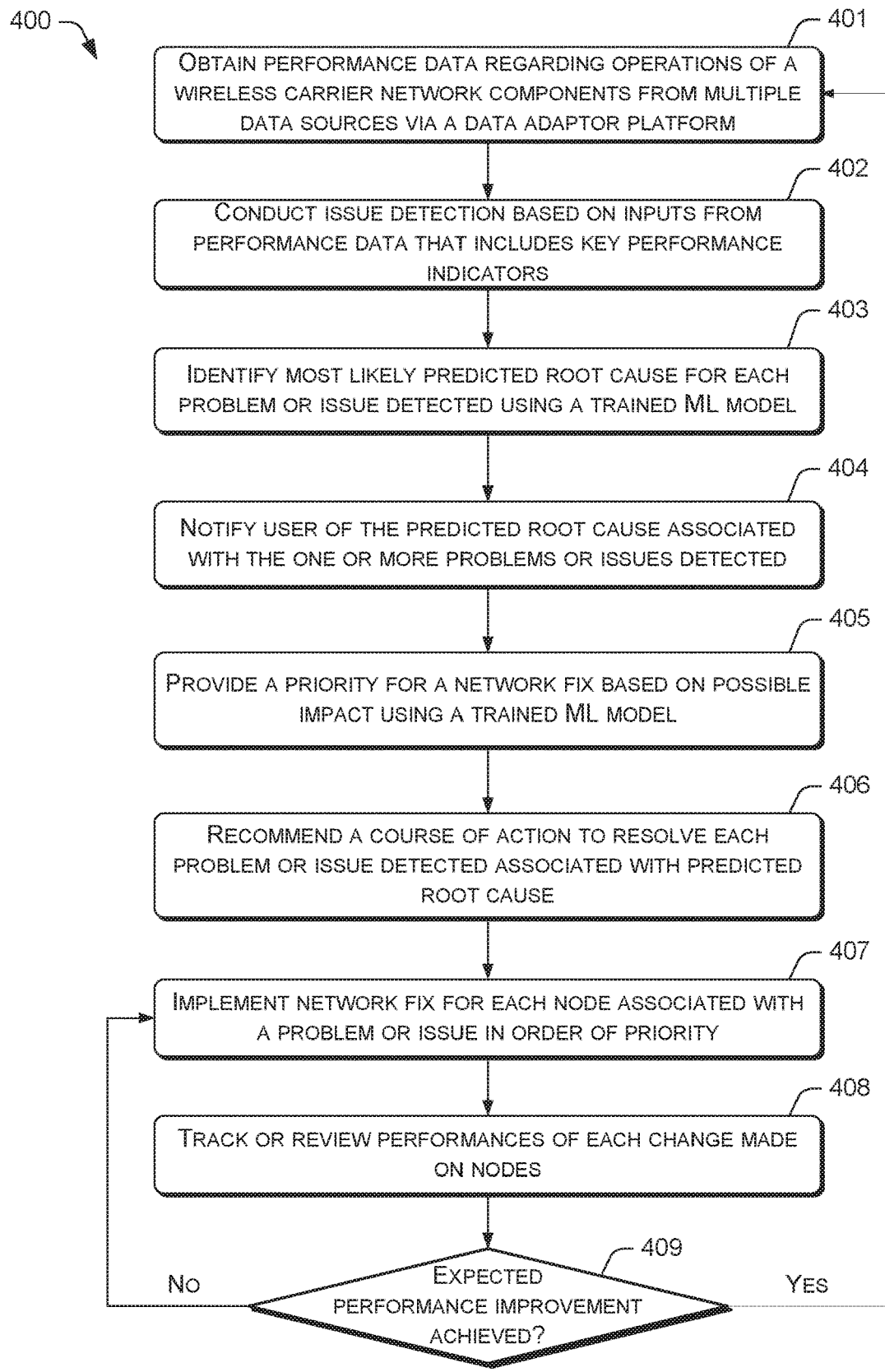
FIG. 4 is a flow diagram showing an exemplary workflow of the automatic network fix application that provides a predicted root cause and network fix prioritization for short and long-term quality of service issues for a wireless carrier network.
Figure 5:
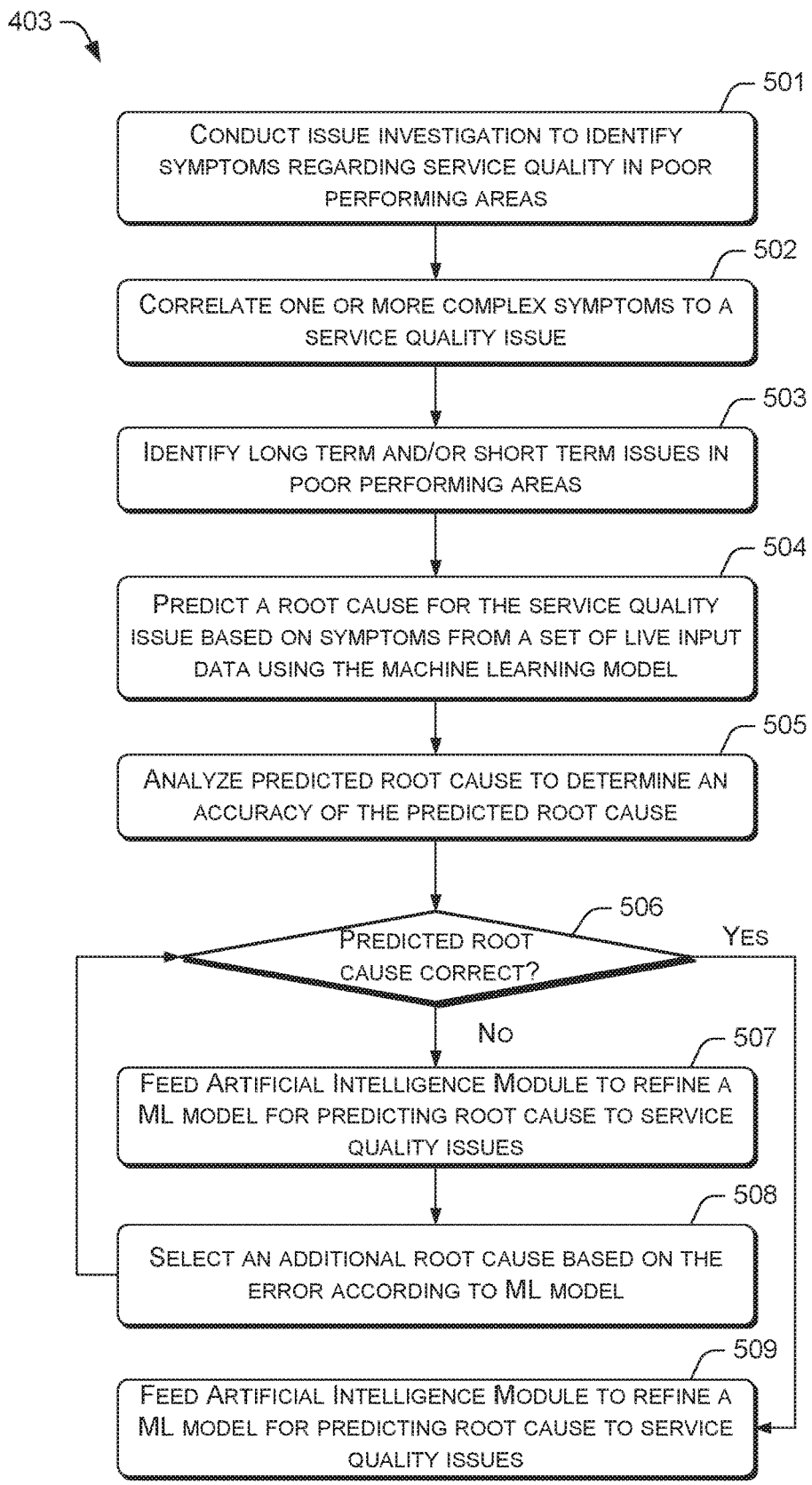
FIG. 5 is a flow diagram of an example process for performing predicted root cause analysis using a trained machine learning model.

FIGS. 4-6 present illustrative processes for performing proactive device and network data analysis of a wireless carrier network to predict root cause relating to quality of service issues and to provide network fix prioritization. Each of the processes is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in a mirror to implement the process. For discussion purposes, the processes herein are described with reference to the architecture 100 of FIG. 1.

FIG. 4 is a workflow of an exemplary process 400 of the automatic network fix application for providing a predicted root cause and automatic issue prioritization for a service issue. The implementation of the network fix application 400 may initially involve obtaining performance data regarding operations of a wireless carrier network and its components including user devices from multiple data sources 110-114 using the data adaptor platform 401. More particularly, the performance data may include operation data obtained from the trouble ticket data from the trouble ticket data source 110, operational data source 111, alarm data from the alarm data source 112, relevant social media data from the social media data source 113, and additional data from the other data sources 114 as well as any associated data.

For example, the associated data may include user KPIs, network KPIs, alerts, network component health indicators, and/or so forth. The performance data may be relevant to the one or more network components of the wireless carrier network or one or more device components of user devices that use the wireless carrier network. The user device components may include device applications (e.g., a telephony application), device hardware (e.g., a radio transceiver), and/or so forth. The network components of the wireless carrier network may include network cells, RAN elements, backhauls, core network elements (e.g., gateway servers, Policy and Charging Rule Functions (PCRFs), IP multimedia subsystem (IMS) core, etc.), and Internet servers (e.g., application servers, multimedia servers, etc.)). The data may be prepared for analysis via aggregation, convergence, and/or other forms of data processing. In some embodiments, the network fix application may also continuously update data input based on data from various sources.

At block 402, the network fix application analyzes the obtained data in order to detect network service issues. The issues may potentially impact that quality of service that is received by the subscribers of the one or more user devices as the subscribers make voice calls, multimedia calls, upload data, and/or download data using the wireless carrier network. The network fix application may analyze trends and conduct clustered analysis and/or individual analysis. For example, the network fix application may cluster data sources for different regions or analyze each issue individually. In some embodiments, the network fix application may make such a determination based on a query that is inputted into an application user interface that is provided by the application.

FIG. 5 is a detailed work flow for performing predicted root cause analysis using a trained machine learning model. At block 501, the issue investigation module 210 conducts issue investigation to identify symptoms regarding service quality in poor performing areas. Poor performing areas are geolocations where performance metric of a network component is below a predetermined performance threshold. Alternatively, poor performing areas are geolocations where a bottleneck that is responsible for a potential delay during the usage instance, or where network components experience a rate of error that is higher than a maximum error threshold. At block 502, the issue investigation module 210 correlates one or more complex symptoms to a service quality problem by matching the symptoms with previously stored performance pattern or symptoms that corresponds to a particular type of service quality issue and/or root cause. Accordingly, at block 503, the issue investigation module 210 identifies specific long-term and/or short-term problems in poor performing areas. At block 504, the root cause analysis module predicts a root cause for the identified wireless carrier network issues based on a set of live input data using the machine learning model.

At block 505, the artificial intelligence module analyzes the predicted root cause to determine whether the predicted root cause is, in fact, the correct root cause for the quality of service issues. At decision block 506, the artificial intelligence module determines whether the predicted root cause is correct. If the predicted root cause is correct, the feedback is fed to the artificial intelligence module 509. If the predicted root cause is not correct, the error is fed to the artificial intelligence module to refine the machine learning model for predicting root cause to service quality issues or problems in block 507. Furthermore, the network fix application may provide an indication, for example via the user interface, to the artificial intelligence module that the predicted root cause was inaccurate or correct. In turn, the model training module of the artificial intelligence module may retrain a machine learning model. During retraining, the model training module may receive an input from a network engineer indicating the correct root cause. Accordingly, the input from the engineer may be added as a data point to the training corpus for retraining of the machine learning algorithms of the machine learning model. In some instances, the engineering may also provide additional input to the model training module that indicates specific anomalous data (e.g., observations or assertions) to be removed from the training corpus. The removal of the specific anomalous data from the training corpus may prevent the machine learning model from generating ineffective solutions for performance data inputs.

Alternatively or concurrently, the model training module may configure the rules engine to modify the algorithm selection rules during retraining. The modifications to the algorithm selection rules may change a range of training error measurement values that correspond to a type machine learning algorithm, cause specific ranges of training error measurement values to match to different types of machine learning algorithms, and/or so forth. In this way, the model training module may generate a modified trained machine learning model based on the feedback. Thereafter, the artificial intelligence module selects an additional root cause based on the error according to the retrained machine learning model 508.

Returning to block 404 in FIG. 4, the root cause analysis module can notify the user of the predicted root cause associated with one or more problems or issues detected via the user interface. In some embodiments, the network fix application may perform the notification by displaying an alert on an application user interface to a user that is a network engineer, such that the network engineering may notify the subscribers. In other embodiments, the network fix application may automatically send alert messages directly to the subscribers using the contact information of the subscribers. The alert message may include information relating to the predicted root cause and that enables the subscribers to take preventative measures to stop the potential issue from occurring. At block 405, the network fix application provides a prioritized list for network fix based on possible impact using a trained machine learning model. The network fix application may make such a determination based on the performance data query that is inputted into the application user interface of the application.

FIG. 6 provides a detailed workflow for performing network fix prioritization 403 using a trained machine learning model. At block 601, the impact investigation module 212 performs real-time or non-real-time data analysis to quantify the extent of performance degradation for each poor performing node as indicated in block 601. At block 602, the impact investigation module 212 identifies duration and potential impact of performance degradation correlating to each poor performing node. For example, the impact investigation module may identify the number of subscribers whose data usage negatively affected the performance of a congested network cell at a geolocation. At block 603, the impact investigation module 212 categorizes at least one problem as associated with short and/or long-term quality of service issue. At block 604, the impact investigation module 212 identifies top offenders. In such instances, the impact investigation module may analyze the performance of various network cells to generate a list of one or more top offender cells that contribute to the quality of service issue.

At block 605, the prioritization module 211 ranks network fix for each poor performing node in descending order of priority using a trained machine learning model 605. In some embodiments, the prioritization module 211 may use predefined analytic rules, as well as parameters for prioritizing analysis of different types of collected data. At block 606, the artificial intelligence module 122 analyzes whether the network fix prioritization was optimal. At the decision block 607, the artificial intelligence module 122 determines whether the prioritization is optimal. If the network fix prioritization is optimal, the feedback is fed to the artificial intelligence module 610. If the prioritization is not optimal, the error is fed to the artificial intelligence module to refine the machine learning model for providing net fix prioritization 608. Additionally, the network fix application may indicate to the artificial intelligence module that the network fix prioritization was not optimal and needs adjustment. In turn, the model training module of the artificial intelligence module may retrain a machine learning model as described above based on the feedback regarding the accuracy of the network fix prioritization. Additionally, the model training module may configure the rules engine to modify the machine learning algorithm selection during retraining as described above. Thereafter, the prioritization module 211 re-prioritizes the network fix based on the error according to the retrained machine learning model as indicated in block 609.

Returning now to block 406 in FIG. 4, the auto fix module 214 can recommend a course of action to resolve each problem or issue associated with the predicted root cause. In some embodiments, the auto fix module 214 can utilize a machine learning logic to determine a resolution for root causes and improve the quality of service provided to the subscribers. The auto fix module 214 may retrieve the solution from a solutions database.

For example, courses of actions may include moving the small network cell to a different location, reorient an antenna of the small network cell in a different direction to reshape a cell coverage area, modifying the data throughput of the communication between the small network cell and a macrocell, updating the device software of the small network cell, and/or so forth. The courses of action may be presented by the network fix application 118 to a user via an application user interface. The information on the root cause and/or the solution to the root cause may be visualized with reference to specific subscribers, specific user devices, specific geolocations, specific geographical areas, specific network cells, and/or so forth. As indicated in block 407, the courses of action or the network fix for each node associated with a problem is implemented in an order of priority based on the network fix prioritization. The remediation action may also include sending another alert message to a network engineer. In some embodiments, the user can reconfigure the network fix prioritization or the resolution for implementation based on the presented information.

As indicated in block 408, the verification module 217 of the action tracker 121 tracks or reviews performances of each change made on nodes. In this regard, the user interface of the network fix application may provide a unified view of a comprehensive look at the performance of the wireless carrier network in the geographical area, such that a user may examine the integration of the network components in the area. In various embodiments, the performance data may be visualized according to specific subscribers, specific geolocations, specific geographical areas, specific network cells, and/or so forth. In some instances, the action tracker 121 may further generate a work log that documents the root causes, net fix prioritization, and resolutions for the network issues.

For tracking the performance of network devices in relation to small network cells, macro cells, and backhauls of the wireless carrier network, the network fix application may further retrieve quality of service metrics for user devices of subscribers as the user devices access a wireless carrier network via one or more small network cells in a geographical area. In various embodiments, the quality of service metrics may include call establishment delays, MOS of call audio quality, records of one-way audio problems, records of call drops, and/or so forth.

In some embodiments, the network fix application 118 may compare the performance of one or more small network cells in the geographical area with respect to the quality of service metrics for the user devices. In various embodiments, a small network cell may be a microcell, a femtocell, or a picocell. The performance of a small network cell may include an available bandwidth of the network cell, a signal coverage area of the cell, a data throughput of the network cell, average up time of the network cell, and/or so forth during a time interval.

At the decision block 409, the feedback module 218 of the action tracker 121 analyzes if the expected performance improvement was achieved, wherein the expected performance improvement is achieved when the network performance level is equal to or greater than a predetermined threshold. If the expected performance improvement is not achieved or the network performance level is not above the predetermined threshold, then the auto fix module 214 of the recommendation module 120 implements a different network fix associated with the quality of service issue. This process is repeated until the expected performance improvement is achieved.

The proactive analysis of user device performance data and network performance data of a wireless carrier network to automatically predict root cause and prioritize network fix for the quality of service issues corresponding to the root cause may reduce subsequent troubleshooting and improve the overall quality of service. Further, the use of a machine learning model during the analysis may minimize potential problems linked to predicted root causes before the problems reach subscribers and resolve the root causes in the most optimal manner.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving performance data regarding user device and network components of a wireless carrier network from multiple data sources, the performance data including one or more of network component performance data, user device performance data, social media data, alarm data, trouble ticket data, or key performance indicator data;
   identifying at least one issue affecting the network performance in one or more poor performing geographical areas, wherein the issue negatively impacts the performance data to fall below a predetermined threshold;
   analyzing the performance data using a trained machine learning model to determine a predicted root cause for the issue affecting the network performance, the trained machine learning model employing multiple types of machine learning algorithms to analyze the performance data;
   providing at least one of the predicted root cause for presentation via a user interface;
   refining the machine learning model based on user feedback regarding an accuracy of the predicted root cause, the refining including retraining the machine learning model based on at least one of a training corpus that is modified based on the feedback or one or more modified algorithm selection rules;
   providing a network fix prioritization for each of the issues to implement a solution that resolves the predicted root cause for the issue; and
   refining the machine learning model based on user feedback regarding an accuracy of the network fix prioritization, the refining including retraining the machine learning model based on at least one of the training corpus that is modified based on the feedback or one or more modified algorithm selection rules.

2. The one or more non-transitory computer-readable media of claim 1, wherein the acts further comprise:
   notifying at least one user of the predicted root cause affecting the network performance via the user interface.

3. The one or more non-transitory computer-readable media of claim 1, wherein the acts further comprise:
   recommending at least one course of action using the trained machine learning model to resolve the issue based on the predicted root cause.

4. The one or more non-transitory computer-readable media of claim 3, wherein the acts further comprise:
   analyzing the performance data using the trained machine learning model to determine a potential impact of the issue affecting the network performance; and providing, based on the potential impact, the network fix prioritization for the issue to implement the at least one course of action to resolve the issue in a specific order.

5. The one or more non-transitory computer-readable media of claim 3, wherein the acts further comprise:
reviewing changes made to one or more nodes within the one or more poor performing geographical areas based on the course of action;
tracking the network performance to determine whether an expected performance improvement is achieved.

6. The one or more non-transitory computer-readable media of claim 1, wherein the acts further comprise:
determining an accuracy of the predicted root cause;
when the predicted root cause is not accurate, retraining the trained machine learning model using an additional type of machine learning algorithm based on an error relating to the predicted root cause; and
providing a second predicted root cause for presentation via the user interface.

7. The one or more non-transitory computer-readable media of claim 1, wherein the step of analyzing the performance data includes analyzing real-time performance data or non-real-time performance data for a particular time interval.

8. The one or more non-transitory computer-readable media of claim 1, wherein analyzing the performance data includes tracking geolocations of the user device during a particular time interval and analyzing the performance data that are related to the geolocations to determine the predicted root cause.

9. The one or more non-transitory computer-readable media of claim 1, wherein analyzing the performance data includes analyzing a performance of various network cells to generate a list of one or more top offender cells that contributes to the issue.

10. The one or more non-transitory computer-readable media of claim 1, wherein the acts further comprise:
determining whether the network fix prioritization is optimal;
when the network fix prioritization is determined to be not optimal, retraining the trained machine learning model using an additional type of machine learning algorithm based on an error relating to the network fix prioritization; and
providing a second network fix prioritization for presentation via the user interface.

11. A computer-implemented method, comprising:
receiving, at a data adaptor platform executing on one or more computing nodes, performance data regarding user device and network components of a wireless carrier network from multiple data sources, the performance data including one or more of network component performance data, user device performance data, social media data, alarm data, trouble ticket data, or key performance indicator data;
identifying at a network fix application executing on the one or more computing nodes, at least one issue affecting the network performance in one or more poor performing geographical areas, wherein the issue negatively impacts the performance data to fall below a predetermined threshold;
analyzing, via the network fix application executing on the one or more computing nodes, the performance data using a trained machine learning model to determine a predicted root cause for the issue affecting the network performance, the trained machine learning model employing multiple types of machine learning algorithms to analyze the performance data; and
providing, via the network fix application executing on the one or more computing nodes, at least one of the predicted root cause for presentation via a user interface;
refining the machine learning model based on user feedback regarding an accuracy of the predicted root cause, the refining including retraining the machine learning model based on at least one of a training corpus that is modified based on the feedback or one or more modified algorithm selection rules;
providing a network fix prioritization for each of the issue to implement a solution that resolves the predicted root causes for the issue; and
refining the machine learning model based on user feedback regarding an accuracy of the network fix prioritization, the refining including retraining the machine learning model based on at least one of the training corpus that is modified based on the feedback or one or more modified algorithm selection rules.

12. The computer-implemented method of claim 11, wherein providing the network fix prioritization for each of the issues comprises:
analyzing a performance of various network cells to generate a list of one or more top offender cells that contributes to the issue; and
ranking the top offender cells in order of priority to provide the network fix prioritization for each of the issues.

13. The computer-implemented method of claim 11, further comprising:
recommending at least one course of action using the trained machine learning model to resolve the issue based on the predicted root cause.

14. The computer-implemented method of claim 11, further comprising:
determining an accuracy of the predicted root cause;
when the predicted root cause is not sufficiently accurate, retraining the trained machine learning model using an additional type of machine learning algorithm based on an error relating to the predicted root cause; and
providing a second predicted root cause for presentation via the user interface.

15. The computer-implemented method of claim 11, wherein analyzing the performance data includes analyzing real-time performance data or non-real-time performance data for a particular time interval.

16. An apparatus comprising:
one or more processors, wherein the apparatus is configured to use the one or more processors to perform acts comprising:
receiving performance data regarding user device and network components of a wireless carrier network from multiple data sources, the performance data including one or more of network component performance data, user device performance data, social media data, alarm data, trouble ticket data, or key performance indicator data;
identifying at least one issue affecting the network performance in one or more poor performing geographical areas, wherein the issue negatively impacts the performance data to fall below a predetermined threshold;
analyzing the performance data using a trained machine learning model to determine a predicted root cause for the issue affecting the network performance, the trained machine learning model employing multiple types of machine learning algorithms to analyze the performance data;

providing at least one of the predicted root cause for presentation via a user interface;

refining the machine learning model based on user feedback regarding an accuracy of the predicted root cause, the refining including retraining the machine learning model based on at least one of a training corpus that is modified based on the feedback or one or more modified algorithm selection rules;

providing a network fix prioritization for each of the issue to implement a solution that resolves the predicted root causes for the issue; and refining the machine learning model based on user feedback regarding an accuracy of the network fix prioritization, the refining including retraining the machine learning model based on at least one of the training corpus that is modified based on the feedback or one or more modified algorithm selection rules.

17. The apparatus of claim 16, wherein providing the network fix prioritization for each of the issues comprises:

analyzing a performance of various network cells to generate a list of one or more top offender cells that contributes to the issue; and ranking the top offender cells in order of priority to provide the network fix prioritization for each of the issues.

18. The apparatus of claim 16, wherein the acts further comprise:

recommending at least one course of action using the trained machine learning model to resolve the issue based on the predicted root cause.

19. The apparatus of claim 16, wherein the acts further comprise:

determining an accuracy of the predicted root cause;

when the predicted root cause is not accurate, retraining the trained machine learning model using an additional type of machine learning algorithm based on an error relating to the predicted root cause; and providing a second predicted root cause for presentation via the user interface.

20. The apparatus of claim 16, wherein analyzing the performance data includes analyzing real-time performance data or non-real-time performance data for a particular time interval.

* * * * *